Feb. 26, 1935.  C. C. ALVORD  1,992,408
LOCKING CAP FOR GASOLINE TANKS
Filed March 21, 1934

INVENTOR
Charles C. Alvord

Patented Feb. 26, 1935

1,992,408

UNITED STATES PATENT OFFICE 1,992,408

LOCKING CAP FOR GASOLINE TANKS

Charles C. Alvord, Worcester, Mass.

Application March 21, 1934, Serial No. 716,690

11 Claims. (Cl. 70—90)

This invention relates to a locking cap for the filler tube of gasoline tanks and the like. The main object of the invention is the construction of a cap which will lock automatically while being attached to the filler tube in the well known manner and without the use of the key or any additional action by the attendant.

Another object is the construction of a locking cap which will not permit water to leak through and into the gasoline tank with subsequent ill effects on combustion.

A further object resides in the method of firmly, but detachably, securing the cap to filler tubes of slightly varying dimensions. These and other features of the invention will be explained in the following specification and will be defined in the claims hereto annexed.

In the drawing I have shown the preferred form of the invention in which.

Figure 1:
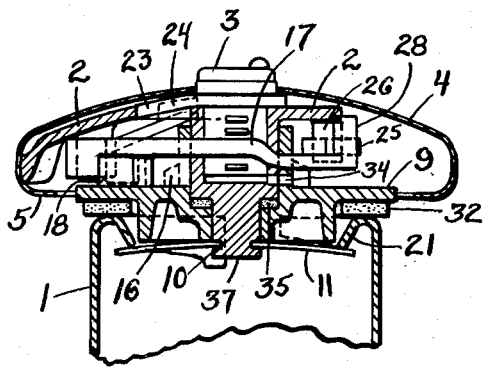
Fig. 1 is a partial cross section of a full size elevation of my cap seated on a gasoline tank filler tube.

Nearly all modern automobiles are equipped with bayonet type throats on their filler tubes and for that reason I have illustrated that construction of the filler tube 1, though my invention is equally applicable to the old style, screw-on type of cap. The cap is composed of a main housing 2 in which is seated the lock plug 3. A plated shell 4 is then dropped onto the housing 2 and the lower edge 5 rolled over in the conventional manner, thus securing the plated shell firmly against rotational slippage on the housing. The shoulder 6 on the lock plug 3 prevents the latter from rising vertically out of its seat, though I provide sufficient looseness between the shell and the shoulder to permit the ready turning of the lock plug by its key when desired. The tumblers 7 normally enter into slot 8 in the housing 2 as is common in all such locks, turning of the lock plug being possible only when all of the tumblers have been fully retracted by use of the proper key.

Figure 2:
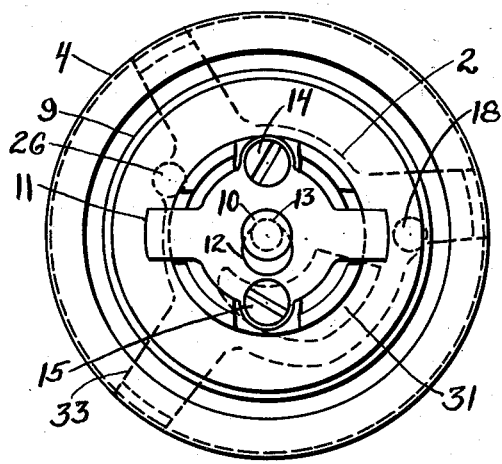
Fig. 2 is a bottom plan view of my cap.

A tank closing member 9 is rotatably mounted on housing 2. As will be seen in Figs. 1 and 2 the central stem 37 of housing 2 extends through and below tank closing member 9 where it is necked in at 10. Fig. 2 shows that the bayonet lock spring 11 has a clearance hole 12, large enough to slip over the lower end of stem 37 and merging into a segment of a smaller hole 13. The spring is first slipped over the grooved end of member 2 and then when opposite the groove is moved vertically downward as shown in Fig. 2 to the position shown therein, and the two screws 14 and 15 are run into tapped holes in the tank closing member 9. This arrangement forms a rapid, secure and easily detachable means for holding 2 and 9 together. Members 2 and 9 are now free to rotate with respect to each other but cannot be separated axially without removal of the bayonet lock spring 11.

The tank closing member 9 has several ratchet teeth 16 formed on its upper portion. A lever 17 pivoted on a post 18 fast on main housing 2 carries a pawl 19 pivoted on post 20 fast on lever 17. This pawl is formed and adapted to engage a tooth 16 and seats the cap snugly on the filler tube whenever the cap is rotatively tightened in the customary, clockwise manner. Continued clockwise rotation gradually flexes the bayonet lock spring 11 downward as shown in Fig. 1 due to the increasing depth of cam surfaces 21 and increases the yielding pressure which serves to plug the intake orifice.

Figure 3:
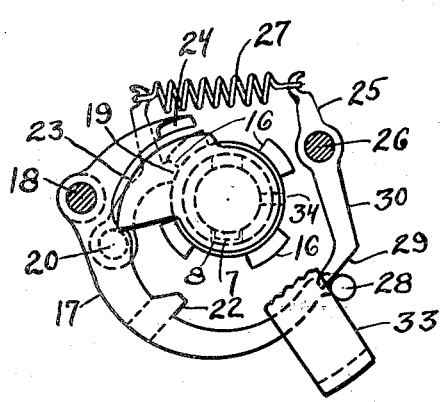
Fig. 3 is a plan view of the locking and unlocking mechanism, showing the mechanism locked, certain parts being removed for the sake of clarity.

After the cap has been seated it is impossible to remove it by the usual counter-clockwise turning movement as pawl 19 merely clicks or freewheels backward over teeth 16 and therefore cannot transmit its turning movement to release the tank closing member 9. Unauthorized access to the gasoline tank by any individual is thus prevented. In order to permit the transmission of counter-clockwise motion from the hand hold shell 4 to the tank closing member 9 I form a pawl tooth 22 on lever 17 adapted to engage a tooth 16 whenever lever 17 is moved to the position shown in Fig. 4. To move the lever to that position from the one shown in Fig. 3 it is merely necessary to insert the key into the lock plug 3 which retracts the tumblers 7 thus allowing the lock plug to be turned clockwise as in Fig. 4. The lock plug is provided with a cam 23 so situated as to bear against arm 24 on lever 17 while the lock is being turned. One good way of retaining lever 17 in either of its two positions is to provide a lever 25 pivoted on post 26 fast on housing 2. A tension spring 27 serves the dual purpose of urging pawl 19 constantly inwards against the ratchet teeth as well as exerting a counterclockwise turning strain on lever 25. When the parts are in the closing position shown in Fig. 3, vertically extending lug 28 on lever 17 bears against surface 29 and, as the force applied to the lug is at right angles to the surface, it will be seen that the tendency is to twist lever 17 clockwise. On the other hand, when the key moves the cam the parts are in the removal position shown in Fig. 4 with lug 28 bearing against surface 30. The coil spring acts on lever 25 to urge pawl tooth 22 yieldingly against the ratchet teeth 16 and causes it to stay and function there. Cam 23 on the lock plug and arm 24 on lever 17 work in a suitably shaped opening 31 in housing 2.

Figure 4:
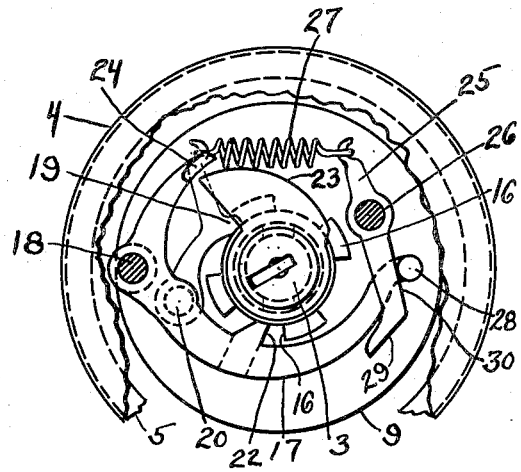
Fig. 4 is a similar plan view showing the parts unlocked.
Figure 5:
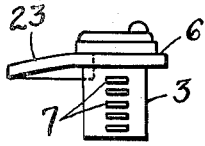
Fig. 5 is a side elevation of the lock plug employed in my cap.

As soon as the parts have been moved to the position of Fig. 4 the lock plug may be turned back to its original, or normal, position and the key withdrawn. The cap is now ready to be removed from the filler tube by the customary counter-clockwise turning movement. After gasoline has been added to the tank the attendant turns the cap on in the usual manner but, due to my unique mechanism, the cap automatically locks against removal without the use of the key or any additional action by the attendant. Fig. 4 shows the position of the parts when the cap is removed from the tube. The gas station attendant starts to attach the cap and as soon as resistance is encountered due to the increasing pressure on filler tube gasket 32 a point is soon reached where lever 17 is forced back to the position shown in Fig. 3 due to all the turning strain being borne by post 20 which is not a fixed post but, as previously pointed out, is formed on lever 17. Therefore lever 17 is moved clockwise freeing pawl tooth 22 from the ratchet teeth 16 and once in such a position the cap will freewheel backwards and cannot be removed without further use of the key. Leg 33 on housing 2 is so situated that lug 28 impacts against it preventing further motion of lever 17 and allowing the full turning on effect to be transmitted from the outer or hand hold shell to the tank closing member.

I wish to emphasize the desirability of this type of construction. In actual practice the car owner can unlock his cap before getting into his car and then drive to the gas station where the attendant can remove and replace the cap in exactly the same manner and just as rapidly as he does any non-locking type of cap. In other words, the use of the key to unlock the cap is the sole added step required over and above the steps necessary for a complete operative cycle of a non-locking type cap of the bayonet attachment type. Although the owner has not moved from his seat or handed the attendant any key he knows that if the attendant has replaced the cap it must have locked automatically in the process and there is no danger of gasoline theft. Should the parts inadvertently become re-set to the position of Fig. 3 while the cap is off the filler tube that is of no consequence as the cap mechanism must move to that position anyway during the reseating process.

During rainy weather or when a car is being washed there is possibility that water may seep down through or around the lock plug and in order to allow such water to drain off I provide a hole or holes 34, seen in Fig. 1, which will allow the escape of the water over the top of the flange on the tank closing member and away from the entrance to the tank. As a further precaution against leakage of water through the cap and into the tank with subsequent ill effects on combustion I employ a gasket 35, preferably oil soaked, to check the passage of water at the only possible entrance to the tank when the cap is attached.

Figure 6:
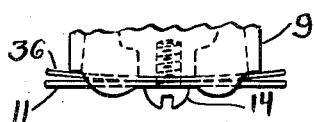
Fig. 6 is a partial side elevation of my cap showing one variation of bayonet lock spring.

Since filler tubes manufactured by different concerns show slight variations in the depth of cam surfaces 21 I may prefer to employ a double type of bayonet lock spring 36 as illustrated in Fig. 6. This view shows a lighter gage spring associated with the regular bayonet lock spring 11, attaching screws 14 and 15 passing through aligned holes in the two springs. The ends of spring 36 are bent upwards to provide relatively light, but still substantial pressure on filler tubes with shallow cams. Spring 36 being of lighter gage than spring 11 can flex substantially further than spring 11 without exceeding the elastic limit of the metal so that when the cap is used on filler tubes with the average depth of cam both springs can flex the required amount and supply entirely adequate pressure. Thus the cap can be used on filler tubes of various manufacture with the assurance that it will remain firmly seated thereon without danger of rattling loose.

It is to be understood that the particular embodiments of the invention disclosed herein are of an illustrative character and are not restrictive, and that various changes in form, construction and arrangement of parts may be made within the spirit and scope of the following claims.

Having thus described the invention, what is claimed as new, and desired to be secured by Letters Patent, is:

1. A locking cap for gasoline tanks in which the hand hold portion of the cap is normally free-wheeling backwardly with respect to the tank closing portion of the cap, key controlled means causing positive engagement between the two portions to permit removal of the cap from the tank and means independent of the key controlled means to permit rotative tightening of the cap onto the tank.

2. In a free wheeling cap for a gasoline tank, the combination of a housing member rotatively mounted on a tank closing member with a bayonet lock spring formed and adapted to prevent axial displacement of one member with respect to the other member.

3. In a locking cap for the filler tube of a gasoline tank, in combination, a hand hold housing member provided with a fulcrum for a pawl lever and a fulcrum for a spring actuated lever, a pawl lever carried by one of said fulcrums, a spring actuated lever carried by the other fulcrum and serving to yieldingly position the pawl lever at either one of two operating positions, a spring actuated pawl fulcrumed on the pawl lever, a tank closing member provided with ratchet teeth adapted to be engaged by said pawl whereby the cap may be rotatively turned onto its seat to seal the filler tube orifice and key controlled means adapted to move said pawl lever into engagement with the ratchet teeth to permit the removal of the cap from the filler tube.

4. In a locking cap for the filter tube of a gasoline tank, in combination, a toothed sealing plug for the filler tube, hand operable pawl means engaging the toothed sealing plug and adapted for moving the cap in one direction whereby the filler tube may be sealed by said plug, and a second pawl engaging said toothed sealing plug when key actuated and adapted to be manually moved in the opposite direction for disengaging the cap from the filler tube.

5. In a locking cap for the filler tube of a gasoline tank, means formed and adapted to move into locked position while the cap is being turned in its closure direction on the tube, key actuated means for moving said first means into unlocking position, retaining means for yieldingly holding said first means in either locked or unlocked position and means acting automatically on said key actuated means to move it into locking position while the cap is being turned in its closure direction.

6. In a locking cap for the filler tube of a gasoline tank, mechanism formed and adapted to be moved into one position whereby the cap is locked against removal from its seat on the filler tube and into a second position by the use of a key whereby the cap is unlocked to permit removal and means rendered automatically operable for moving the mechanism into locking position by the act of moving the cap on its seat in the closure direction.

7. In a cap for sealing the intake orifice of a gasoline tank, a yielding spring of the bayonet attachment type style for releasably securing the cap in its sealing position on the orifice and an auxiliary spring positioned to act in unison with said first spring, said second spring being formed and adapted to yield for a greater distance than said first spring during the seating of the cap in its sealing position on the tank for the purpose specified.

8. In a locking cap for the filler tube of a gasoline tank, means formed and adapted for the releasable sealing of the tube when rotatably tightened thereon in the closure direction, mechanism movable back and forth between two positions and acting in combination with the sealing movement for automatically locking said cap against removal when the mechanism is in one position and key actuated means for unlocking the cap by moving the mechanism to its other position.

9. A freewheeling type locking cap for a gasoline tank filler tube, said cap having a member formed and adapted for sealing such a filler tube, means for seating said member when it is subjected to a rotative tightening movement and locking means associated with said member whereby the rotative tightening movement may actuate the cap locking mechanism to render the cap freewheeling and thus prevent unauthorized removal of the cap.

10. A freewheeling type locking cap for a gasoline tank, said cap having a member which is formed and adapted for sealing the intake orifice of such a tank, means for seating said member by a rotative tightening movement and locking means associated with said seating member whereby the resistance encountered in seating said member may actuate the locking means and render the cap freewheeling to prevent unauthorized removal of the cap from the tank.

11. In a locking cap for a gasoline tank, a key controlled lock plug, cap locking mechanism associated therewith and adapted to be moved thereby from locked to unlocked position by a forward movement of the lock plug, said mechanism being arranged to remain thus set as the lock plug is moved in reverse direction to its normal position and means to re-set the cap locking mechanism automatically to locked position as the cap is being turned on its seat on the gasoline tank.

CHARLES C. ALVORD.